United States Patent [19]

Elsner et al.

[11] 3,728,631
[45] Apr. 17, 1973

[54] APPARATUS FOR DETECTING NATURAL NONLINEARITIES IN ANTENNAS

[75] Inventors: Raymond F. Elsner, Lombard; James J. Husty, Claredon Hills; Sam Tumarkin, Country Club Hills, all of Ill.

[73] Assignee: The United States of America as represented by the Secretary of the Navy

[22] Filed: Mar. 29, 1972

[21] Appl. No.: 239,066

[52] U.S. Cl. .................... 325/67, 325/133, 325/363, 324/76
[51] Int. Cl. ............................................ H04b 1/00
[58] Field of Search ..................... 325/67, 133, 363; 343/17.7; 324/76, 79, 85, 87

[56] References Cited

UNITED STATES PATENTS 3,609,553    9/1971    Frazier et al. .......................... 325/67

Primary Examiner—Albert J. Mayer
Attorney—R. S. Sciascia

[57] ABSTRACT

A method for determining whether an antenna possesses natural nonlinearities by detecting and classifying radio frequency interference sources existing in the antenna. An alternating current at frequency $F_1$ is passed through a suspected nonlinearity to thereby create $F_1$ harmonic signals. The suspected nonlinearity is then exposed to mechanical forces at frequency $F_2$ by means of a vibrator to cause $F_1$ and $F_2$ to interact and generate intermodulation product signals. Detection of these intermodulation product signals indicates the presence of natural nonlinearities in the antenna.

3 Claims, 1 Drawing Figure

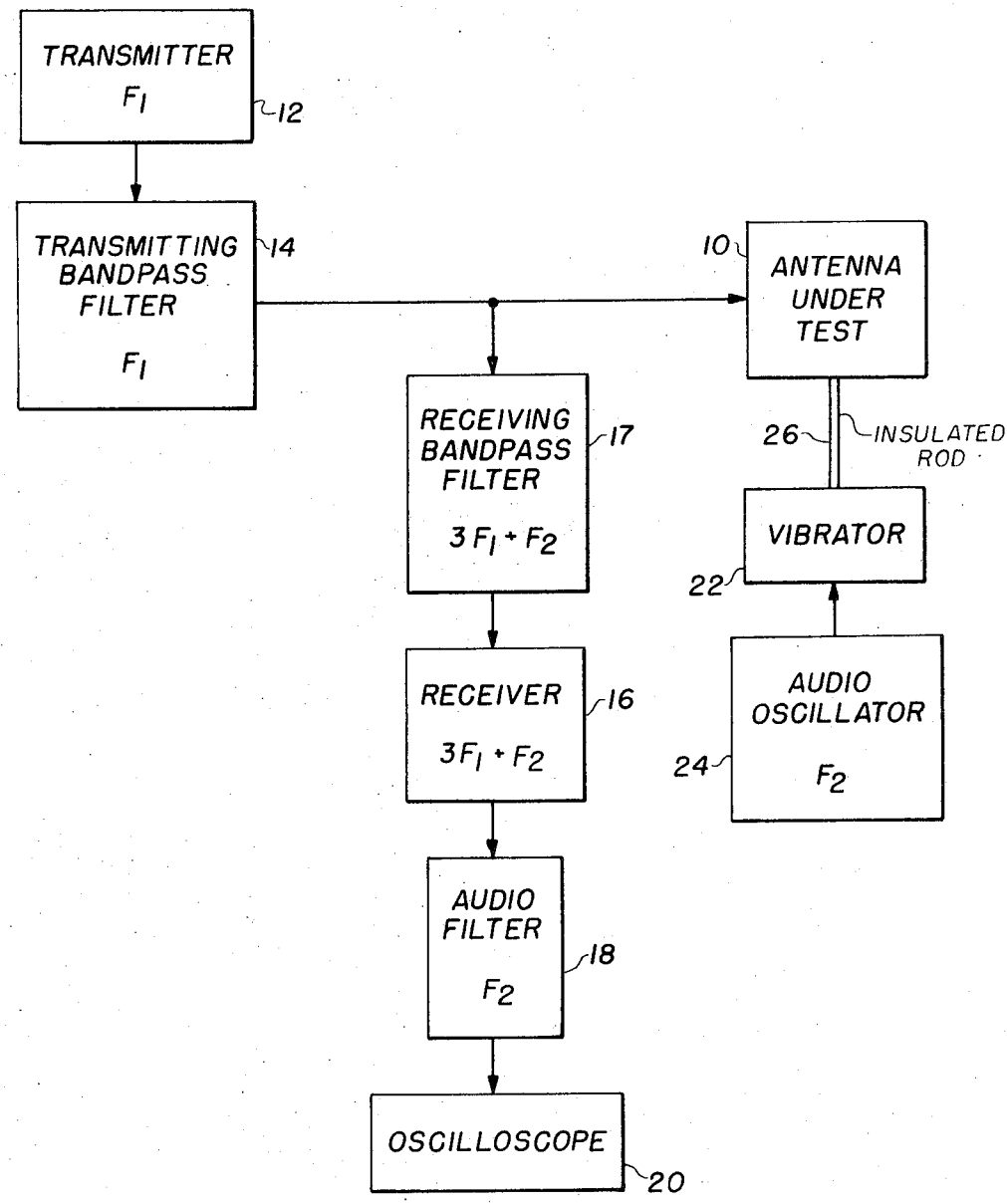

APPARATUS FOR DETECTING NATURAL NONLINEARITIES IN ANTENNAS

CROSS REFERENCE TO RELATED APPLICATIONS

The invention disclosed herein is generally related to the subject matter disclosed in U. S. Pat. No. 3,609,553, Marvin J. Frazier et al., assigned to the United States of America as represented by the Secretary of the Navy.

BACKGROUND OF THE INVENTION

The present invention relates to a method for detecting nonlinearities in antennas as a first step in minimizing the deleterious effects of radio frequency interference on naval communication systems. As is well-known, nonlinear transmitting antennas can generate radio frequency interference such as broadband noise, harmonics and intermodulation products due to the interaction of a fundamental frequency with one or more additional frequencies either through multicoupling or due to other strong transmissions in the vicinity. Receiving antennas exhibit similar effects, particularly when they are immersed in one or more strong radiated fields. Natural nonlinearities can be created, for example, in otherwise linear antennas due to normal deterioration whereby metal component parts of an antenna make intermittent or high-resistant contact. Such contacts are usually nonlinear and can generate radio-frequency interference as described above.

SUMMARY OF THE INVENTION

The subject matter disclosed herein relates to a method and apparatus for positively and readily determining whether natural nonlinearities are present in a given antenna by detecting and classifying radio frequency interference created by the antenna. An alternating current at frequency $F_1$ is passed through a suspected natural nonlinearity in an antenna to generate harmonics of $F_1$. The suspected nonlinearity is then vibrated or hammered impulsively at a second frequency $F_2$ which is usually much lower than $F_1$. The frequencies $F_1$ and $F_2$ interact to generate intermodulation products. Detection of these intermodulation products indicates the presence of natural nonlinearities.

STATEMENT OF THE OBJECTS OF THE INVENTION

It is the object of the present invention to provide simple and highly effective apparatus for detecting natural nonlinearities in antennas.

Other objects, advantages and novel features of the invention will become apparent from the following detailed description of the invention when considered in conjunction with the accompanying drawings.

BRIEF DESCRIPTION OF THE DRAWING

The drawing is a simplified schematic block-diagram of apparatus for detecting the presence of natural nonlinearities in antennas used in communication systems.

DESCRIPTION OF THE PREFERRED EMBODIMENT

In the FIGURE, an antenna 10 which would normally be linear, is shown being tested in accordance with the method embodying the present inventive concept. A transmitter 12 passes signals at $F_1$ through the transmitting bandpass filter 14 to the antenna. Harmonics of the antenna are received at the receiver 16 through the bandpass filter 17. The output of the receiver is coupled to an oscilloscope 20 through the $F_2$ audio filter 18 which filters out excessive noise. A vibrator 22 vibrates or shakes the antenna 10 in response to energization from the audio oscillator 24 whose output is at the frequency $F_2$. The vibrator 22 is mechanically isolated from the antenna by means of an insulated rod 26 and can comprise a model SAC vibrator, manufactured by the MB Mfg. Co., New Haven, Conn.

The operation of the system in the FIGURE will first be described without any vibration being imposed on the antenna under test by the vibrator 22. The transmitter 12 or CW signal source provides a signal output at a selectively predetermined frequency $F_1$ which is operationally compatible with the antenna 10. A bandpass filter 14 is connected to the transmitter output primarily to isolate the transmitter-generated harmonics from the antenna-generated $F_1$ harmonics and intermodulation products which are created if the antenna is nonlinear.

The third harmonic signal ($3F_1$) which generated by the nonlinearities in the antenna and the $3F_1$ signals generated by the environment of the antenna and ambient signals at or near $3F_1$ will be passed to the receiver 16 through the bandpass filter 17. The filter 17 functions to allow only the desired frequency to enter the receiver. Since the signal at frequency $F_1$ is CW, no audio output is obtained from the receiver.

If, however, the vibrator 22 is now used in the system the inventive concept disclosed herein will be readily appreciated. The audio oscillator 24 provides a signal at the frequency $F_2$ to drive the vibrator 22. The vibrator is physically connected to the antenna under test by means of an insulated rod 26, or equivalent, to insure electrical isolation between the antenna and the vibrator.

When vibration, preferably in the form of sharp impulses or shocks, is applied to the antenna, the natural nonlinearities in the antenna are subjected to both $F_1$ (electrical) and $F_2$ (mechanical) forces. The mechanical forces alter the nonlinear characteristics of the natural nonlinearities, and as a result intermodulation products of $F_1$ and $F_2$ ($F_1 + F_2$, $F_1 - F_2$, $2F_1 + F_2$, $2F_1 - F_2$, etc.) are generated.

The presence of any of these intermodulation products at the receiver and the oscilloscope 20 indicates that the antenna is nonlinear due to natural nonlinearities. For example, if the receiver 16 and the receiving bandpass filter 18 are both tuned to the $3F_1 + F_2$ intermodulation product, an audio tone at the frequency $F_2$ could be obtained from the receiver when the nonlinear antenna is vibrated. If a linear antenna is vibrated, no audio tone would be present at receiver output which is coupled by the audio filter to the oscilloscope 20.

Thus, a relatively simple but highly accurate method and apparatus for detecting natural nonlinearities in antennas has been disclosed. The main advantage of the method lies in the fact that the vibration or hammering affects only the antenna being tested and not the local environment which might also contain natural nonlinearities. Thus, the method clearly permits a positive differentiation between an antenna's natural nonlinearity viz-a-viz environmental nonlinearities, which is not the case when strictly electrical techniques are used. Furthermore, for purposes of testing for nonlinearity, receiving antennas can be treated the same as transmitting antennas (within their power ratings) and tested as described above. Furthermore, specific points of nonlinearity can be located using this method by merely temporarily bypassing the suspected nonlinearity (e.g., a metallic junction) with a short metallic conductor. Assuming only one natural nonlinearity exists in an otherwise linear antenna, by-passing the nonlinearity with the short metallic conductor will eliminate the audio $F_2$ signal emanating from the receiver when the antenna is vibrated.

Obviously many modifications and variations of the present invention are possible in the light of the above teachings. It is therefore to be understood that within the scope of the appended claims the invention may be practiced otherwise than as specifically described.

What is claimed is:

1. A method for detecting the presence of natural nonlinearities in an antenna comprising the steps of:

applying electrical signals at a frequency $F_1$ to said antenna to create therein $F_1$ harmonic currents if said antenna has natural nonlinearities;

applying mechanical signals at a frequency $F_2$ to said antenna to create therein $F_1$ and $F_2$ intermodulation product currents if said antenna has natural nonlinearities; and, detecting said intermodulation product currents.

2. The method of claim 1 wherein said electrical signals comprise an alternating current and said mechanical signals comprise vibration impulses.

3. Apparatus for detecting natural nonlinearities in a communication system antenna comprising:

transmitter means connected at the output thereof to said antenna for exciting said antenna with electrical signals at a selectively predetermined frequency $F_1$ to create $F_1$ harmonics in said antenna if natural nonlinearities are present;

said transmitter means including first bandpass filter means for preventing transmitter-generated harmonics from interacting with said $F_1$ harmonics;

electro-mechanical means electrically isolated from and mechanically connected to said antenna to vibrate said antenna at a frequency $F_2$ to thereby alter said natural nonlinearities, whereby said $F_1$ and $F_2$ frequencies will interact and generate intermodulation product currents; and, receiver means connected to said antenna for sensing said intermodulation product currents to indicate the existence of said natural nonlinearities.

* * * * *